(12) United States Patent
Morishita et al.

(10) Patent No.: US 6,360,586 B1
(45) Date of Patent: Mar. 26, 2002

(54) DEVICE FOR DETECTING THE KNOCKING OF AN INTERNAL COMBUSTION ENGINE

(75) Inventors: Tsutomu Morishita; Yasuhiro Takahashi; Koichi Okamura; Kimihiko Tanaya; Mitsuru Koiwa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/496,253

(22) Filed: Feb. 1, 2000

(30) Foreign Application Priority Data

Oct. 6, 1999 (JP) ............................................ 11-285494

(51) Int. Cl.$^7$ ............................................. G01L 23/22
(52) U.S. Cl. ...................................................... 73/35.08
(58) Field of Search ............................... 73/35.03, 35.04, 73/35.05, 35.06, 35.08; 123/406.29, 406.37, 406.38, 406.39

(56) References Cited

U.S. PATENT DOCUMENTS 5,694,900 A 12/1997 Morita et al. ............... 123/425

6,234,146 B1 * 5/2001 Tanaya et al. ......... 123/406.37

FOREIGN PATENT DOCUMENTS

| DE | 197 55 255 | 7/1999 |
| JP | 10-9108 | 1/1998 |

* cited by examiner

*Primary Examiner*—Helen Kwok
(74) *Attorney, Agent, or Firm*—Sughrue Mion, PLLC (57) ABSTRACT

A device for detecting the knocking of an internal combustion engine, which maintains the background level at an optimum value irrespective of the knocking level, and features improved reliability by preventing the erroneous detection of noise or knocking when the knocking level is shifted. The device includes a counter 12 for operating signals N of the knocking level from the ionic current, an averaging circuit 13A for operating an average knocking level AVE, a circuit 14A for operating a background level BGLA by using an offset value, a comparator 15 for judging the knocking by comparing the signals of the knocking level with the background level, a circuit 16 for judging the average knocking level that lies in a predetermined region, and a circuit 17 for correcting the offset value depending on the result of judging the predetermined region, wherein the offset value is corrected toward a direction to cancel the increment or the decrement of the average knocking level depending on the predetermined region.

5 Claims, 10 Drawing Sheets

| AVE2 | 1ST PREDETERMINED REGION | | | | REFERENCE REGION | | | 2ND PREDETERMINED REGION | | | |
|---|---|---|---|---|---|---|---|---|---|---|---|
| | 2.0 | 2.5 | 3.0 | 3.5 | 4.0 | 4.5 | 5.0 | 5.5 | 6.0 | 6.5 | 7.0 |
| CF | 1.4 | 1.3 | 1.2 | 1.1 | 1.0 | 1.0 | 1.0 | 0.9 | 0.8 | 0.7 | 0.6 |
| | >1 (INCREMENT CORRECTION) | | | | NO CORRECTION | | | <1 (DECREMENT CORRECTION) | | | |

PRIOR ART

DEVICE FOR DETECTING THE KNOCKING OF AN INTERNAL COMBUSTION ENGINE

BACKGROUND OF THE INVENTION

1. Field of the Invention

The present invention relates to a device for detecting the knocking of an internal combustion engine based on an ionic current that flows through a spark plug during the combustion in the internal combustion engine. More specifically, the invention relates to a device for detecting the knocking of an internal combustion engine by preventing erroneous detection of noise or erroneous detection of knocking in a state in which the engine is being shifted toward producing an increased number of the signals of the knocking level or a decreased number of the signals of the knocking level.

2. Prior Art

In a device for controlling an internal combustion engine, so far, it is accepted practice to judge the occurrence of knocking during the operation and, when the occurrence of knocking is detected, the control quantity for the internal combustion engine is corrected toward the side of suppressing the knocking (e.g., toward the side of delaying the ignition timing) depending upon the amount of knocking in order to prevent damage to the internal combustion engine.

In order to detect the knocking of the internal combustion engine, therefore, there has been proposed a device that utilizes a change in the amount of ions produced during the combustion of the internal combustion engine.

The device for detecting the knocking of the internal combustion engine based on the ionic current is capable of detecting the intensity of knocking in each of the cylinders without using knock sensor, and is effective in decreasing the cost.

In the device of this type, a background level is set for an ionic current detection signal in order to prevent erroneous detection of the knocking caused by noise superposed on the ionic current.

In a device disclosed in, for example, Japanese Patent Laid-Open No. 10-9108, a background level (reference for judging the noise level) operated from the sum of an average value of the detection signal intensities and an insensitive region (offset value) based on the operation condition, has been set for a signal that is obtained by shaping the waveform of a knock current detection signal.

Figure 6:
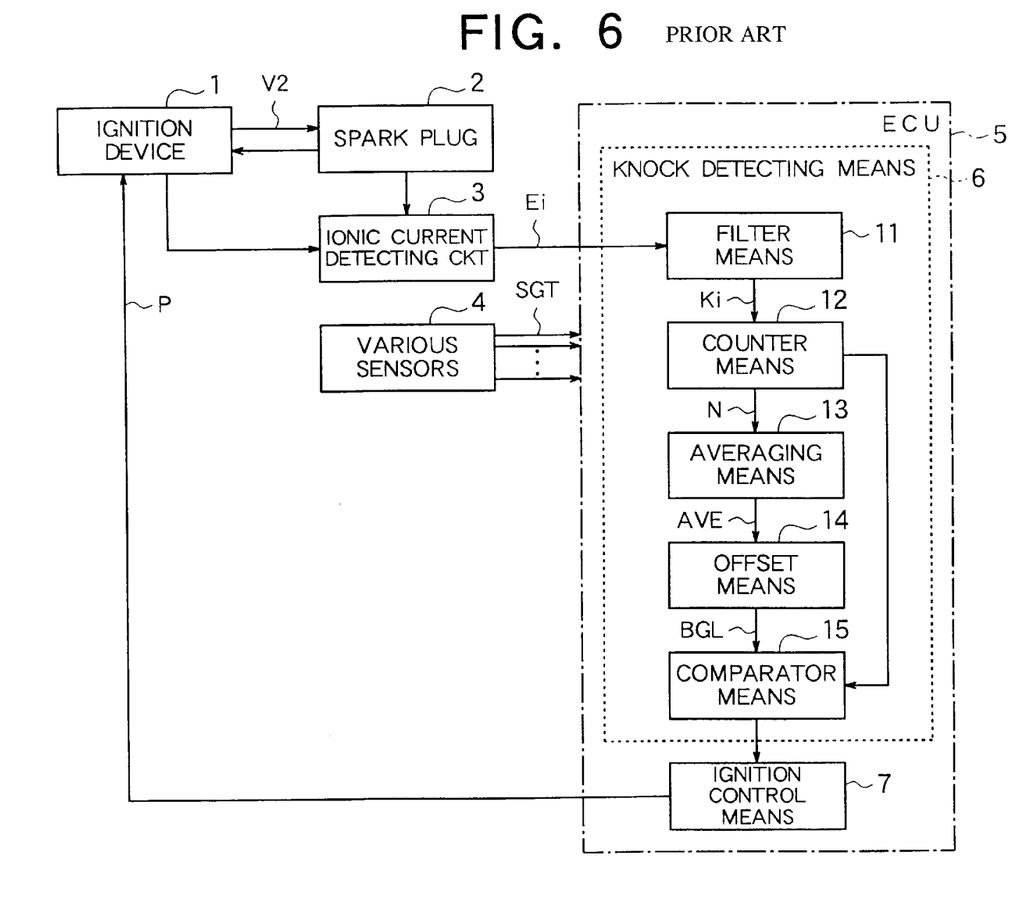
FIG. 6 is a block diagram illustrating a conventional device for detecting the knocking of an internal combustion engine.
Figure 7:
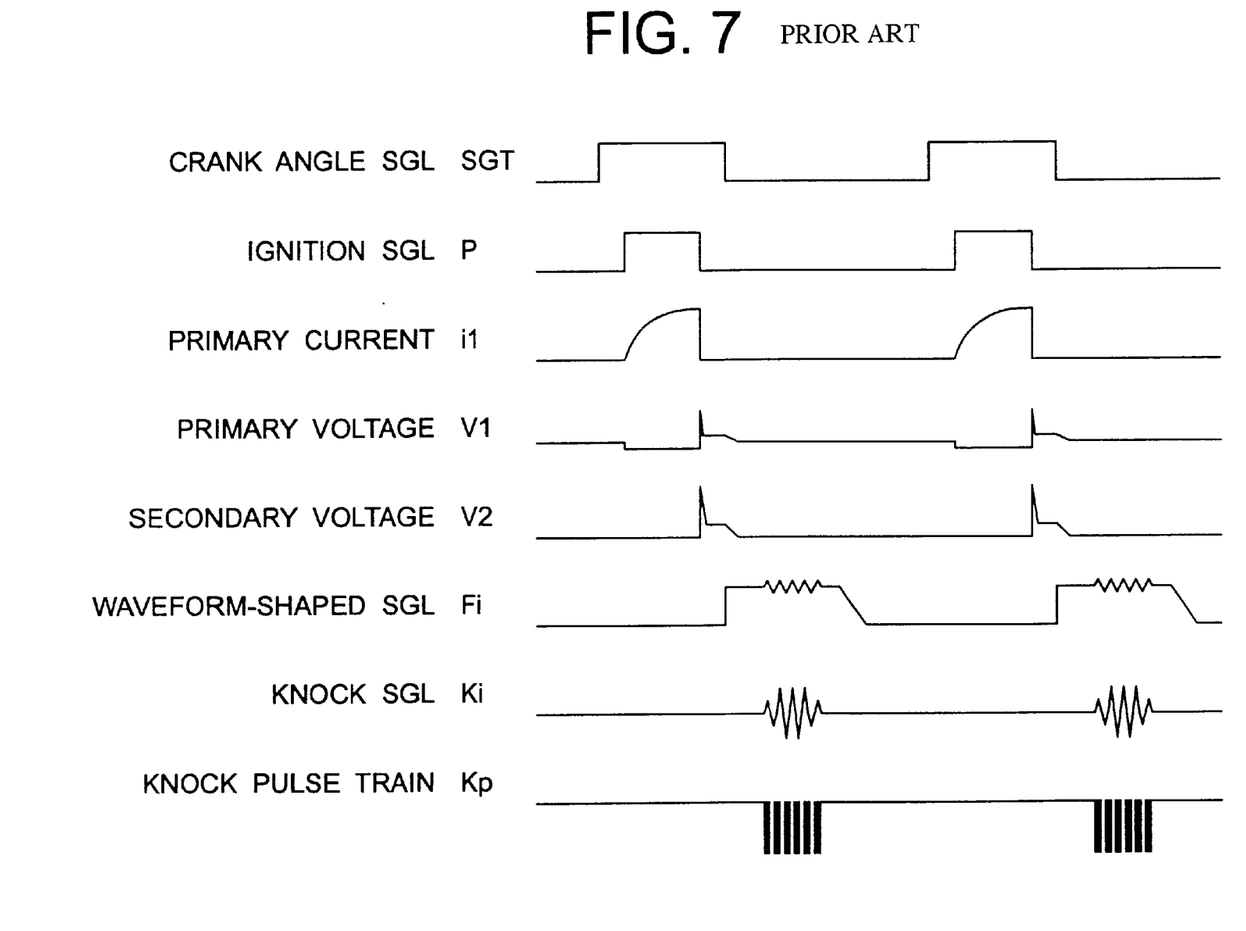
FIG. 7 is a diagram of waveforms illustrating the operation of the conventional device for detecting the knocking of an internal combustion engine.

FIG. 6 is a block diagram schematically illustrating a conventional device for detecting the knocking of an internal combustion engine. FIG. 7 is a timing chart illustrating the operation waveforms of signals in FIG. 6 and shows a case where a knock signal Ki is superposed on a waveform-shaped signal Fi of an ionic current detection signal Ei.

In FIG. 6, the ignition device 1 of the internal combustion engine includes an ignition coil having a primary winding and a secondary winding, and a power transistor (both of which are not shown) for interrupting the flow of the primary current i1 (see FIG. 7) into the ignition coil.

The power transistor in the ignition device 1 turns on and off (flows and interrupts) the primary current i1 to the ignition coil in response to an ignition signal P from an ECU 5, and the ignition coil generates a high ignition voltage V2 (see FIG. 7) through the secondary winding in response to the turn on and off of the power transistor.

Being impressed with a high spark voltage V2 from the ignition device 1, the spark plug 2 generates a spark to ignite the mixture at a predetermined timing in each of the cylinders of the engine.

In order to detect the ionic current that flows across a gap of the spark plug 2 at the time of combustion, the ionic current detecting circuit 3 includes a bias means (capacitor) for applying a bias voltage to the spark plug 2 through the ignition coil in the ignition device 1, and a resistor (both of which are not shown) for producing an ionic current detection signal Ei.

Various sensors 4 include a known throttle opening sensor, a crank angle sensor, a temperature sensor and the like sensors, and produce various sensor signals that represent the operation conditions of the internal combustion engine. For example, the crank angle sensor which is one of the various sensors 4 produces a crank angle signal SGT (see FIG. 7) depending on the rotational speed of the engine.

Various sensor signals inclusive of the ionic current detection signal Ei and the crank angle signal SGT, are input to the ECU 5 that comprises a microcomputer.

The crank angle signal SGT has a pulse edge representing a reference crank angular position in each cylinder, and is used by the ECU 5 for executing various control operations.

The ECU 5 includes a knock detecting means 6 for detecting the knocking based on the ionic current detection signal Ei, and an ignition control means 7 that delays the spark signal P based on the result of detecting the knocking by the knock detecting means 6.

The knock detecting means 6 in the ECU 5 includes a filter means 11 comprising a band-pass filter, a counter means 12, an averaging means 13, an offset means 14, and a comparator means 15.

The filter means 11 includes a waveform-shaping means, and picks up a knock signal Ki in a predetermined frequency band from the waveform-shaped signal Fi (see FIG. 7) of the ionic current detection signal Ei.

The counter means 12 includes a waveform-processing means, and counts the number N of the pulses of the knock signals Ki after their shapes have been processed.

The counter means 12 constitutes a knocking level operation means, and operates the number N of the pulses (signals of the knocking level) corresponding to the knocking state of the engine.

The number N of the pulses (signals of the knocking level) represents the amount of knocking occurring.

The averaging means 13 averages the number N of the pulses to operate an average knocking level AVE.

The offset means 14 offsets the average knocking level AVE and forms a background level BGL (reference for judging the noise level).

The offset means 14 includes an offset operation means for operating an offset value OFS for the average knocking level AVE depending on the operation conditions of the engine, and a background level operation means for operating the background level BGL by adding up the average knocking level AVE and the offset value OFS together.

The comparator means 15 constitutes a knock-judging means, and compares the number N of the pulses (signals of the knocking level) with the background level BGL to judge the knocking state of the engine. When the number N of the pulses exceeds the background level BGL, the comparator means 15 produces the result of comparison representing the occurrence of knocking.

Figure 8:
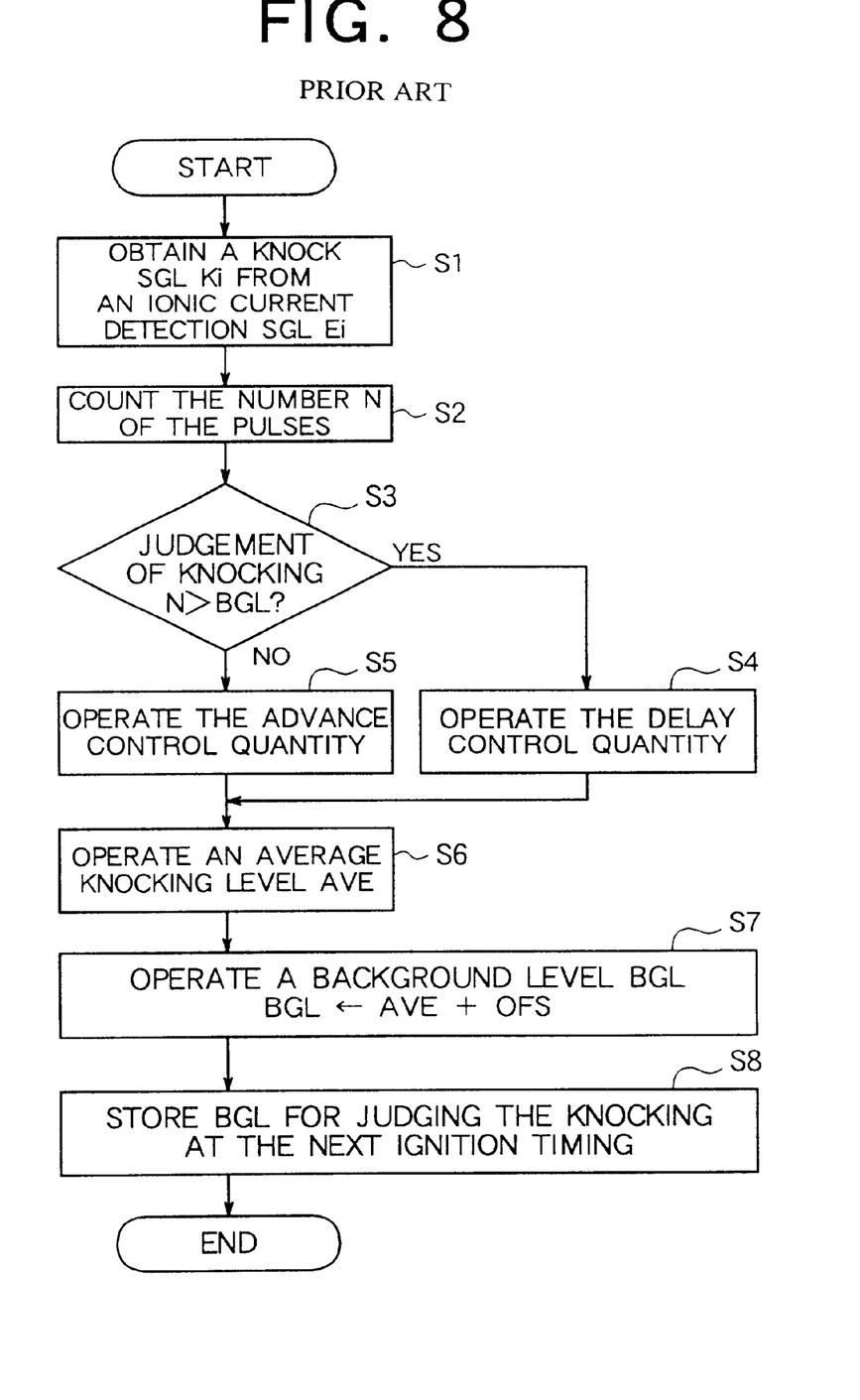
FIG. 8 is a flow chart for operating the background level using the conventional device for detecting the knocking of an internal combustion engine.

Next, described below with reference to FIGS. 6 and 7 as well as a flow chart of FIG. 8 is the operation of the conventional device for detecting the knocking of the internal combustion engine.

First, the ECU 5 receives a crank angle signal SGT and the like signals from various sensors 4, executes various operations depending upon the operation conditions, and produces drive signals to various actuators such as the ignition device 1 and the like.

For example, the ECU 5 turns the power transistor in the ignition device 1 on and off in response to the ignition signal P to flow and interrupt the primary current i1.

In this case, the bias power source (capacitor) in the ionic current detecting circuit 3 is electrically charged with the primary voltage V1 that generates in the ignition coil when the primary current i1 flows therein.

Further, the primary voltage V1 rises when the primary current i1 is interrupted (corresponds to an ignition timing of the engine), and a further elevated secondary voltage V2 (several tens of kV) is generated from the secondary winding of the ignition coil. The secondary voltage V2 is applied to the spark plug 2 of a cylinder in which the ignition is controlled to burn a mixture in the combustion chamber.

As the mixture burns, ions generate in the combustion chamber of the combustion cylinder, and a bias voltage electrically charged in the capacitor in the ionic current detecting circuit 3 is discharged through the spark plug 2 immediately after the ignition control.

The resistor in the ionic current detecting circuit 3 converts the ionic current into a voltage to produce it as an ionic current detection signal Ei.

Thus, the ionic current that flows through the spark plug 2 after the combustion is input as the ionic current detection signal Ei to the knock detecting means 6 in the ECU 5.

When the engine knocks, the knocking vibration components are superposed on the ionic current, and the waveform-shaped signal Fi of the ionic current detection signal Ei acquires a waveform on which the knocking vibration components are superposed as shown in FIG. 7.

Referring to FIG. 8 illustrating the operation for processing the ionic current detection signal Ei, the filter means 11 of the knock detecting means 6 in the ECU 5 picks up the knock signals Ki only from the waveform-shaped signals Fi of the ionic current detection signals Ei (step S1).

The counter means 12 shapes the waveforms of the knock signals Ki to convert them into a knock pulse train Kp, and counts the number N of the pulses in the knock pulse train Kp (step S2).

The number N of the pulses is strongly related to the intensity of knocking and is used for judging the knocking as will be described later and is, further, used for updating the background level BGL in the next time.

That is, the comparator means 15 in the knock detecting means 6 compares the number N of the pulses with the background level BGL that has been operated in the previous time, and judges whether the number N of the pulses is larger than the background level BGL (step S3).

The number N of the pulses increases with an increase in the intensity of knocking and, hence, the comparator means 15 judges the occurrence of knocking and the intensity of knocking based on the number N of the pulses.

When it is judged at step S3 that N>BGL (i.e., YES), the ignition control means 7 operates a delay control quantity for delaying the ignition timing (for suppressing the knocking)(step S4). When it is judged at step S3 that N≦BGL (i.e., NO), the ignition control means 7 operates an advance control quantity (step S5).

Here, the ignition control means 7, at step S4, makes a reference to the delay correction quantity in the ignition control of the previous time and of this time, and, at step S5, makes a reference to the delay correction quantity in the ignition control of the previous time, thereby to operate the control quantities.

When the state N>BGL (knock is occurring) is consecutively judged at step S3, the delay quantities are successively added up, but are no longer added up at a moment when it is judged that no knocking is occurring.

The background level BGL (predetermined number of pulses) that serves as a reference for judging the knocking varies depending on the rotational speed of the engine and the level for shaping the waveforms of the detection signals Ei, but is set to a value of, for example, about 5 to about 20.

When the knocking is detected by the comparator means 15 based on the number N of the pulses, the control quantity is corrected toward the side of suppressing the knocking (i.e., the ignition is optimized for the cylinder in which the knocking is occurring) in order to effectively suppress the knocking.

On the other hand, the averaging means 13 in the knock detecting means 6 averages (filters) the number N of the pulses, and operates an average knocking level AVE by using the following formulas (1) and (2) (step S6).

$$AVE = AVE(n-1) \times KF + NP \times (1-KF) \quad (1)$$

$$NP = \max\{N - BGL(n-1), 0\} \quad (2)$$

In the formula (1), AVE(n−1) is an average knocking level AVE of the previous time, and KF is an averaging coefficient (0<KF<1) and in the formula (2), BGL(n−1) is a background level BGL of the previous time.

The offset means 14 adds an offset value OFS to the average knocking level AVE to operate the background level BGL according to the following formula (3) (step S7), $$BGL = AVE + OFS \quad (3)$$

Finally, the ECU 5 stores the background level BGL operated according to the formula (3) in the offset means 14 as a reference for comparison for judging the knocking of when the ignition is controlled in the next time (step S8), and the processing routine of FIG. 8 ends.

Figure 9:
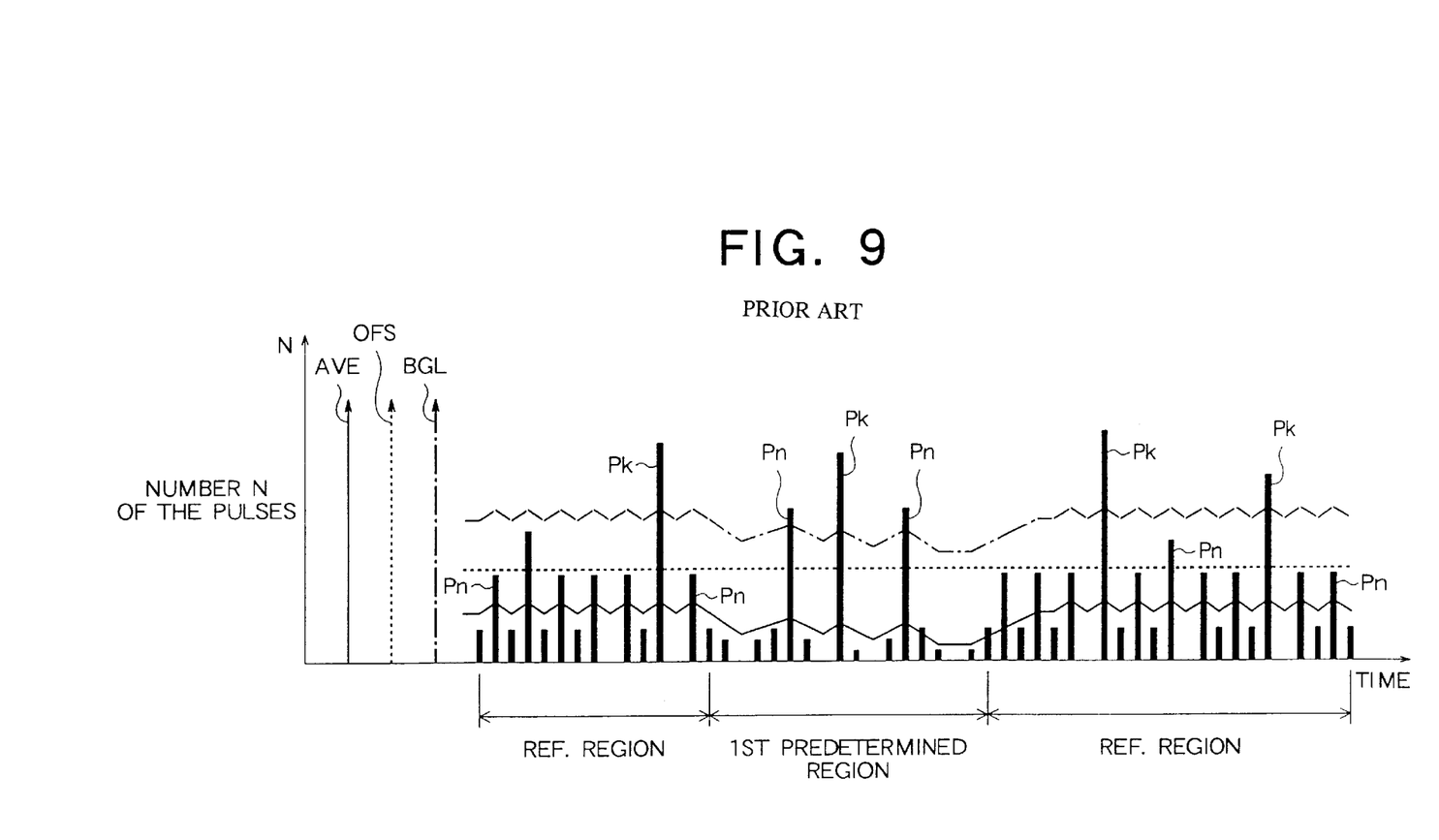
FIG. 9 is a diagram illustrating the operation for detecting the knocking in the first predetermined region using the conventional device for detecting the knocking of an internal combustion engine.
Figure 10:
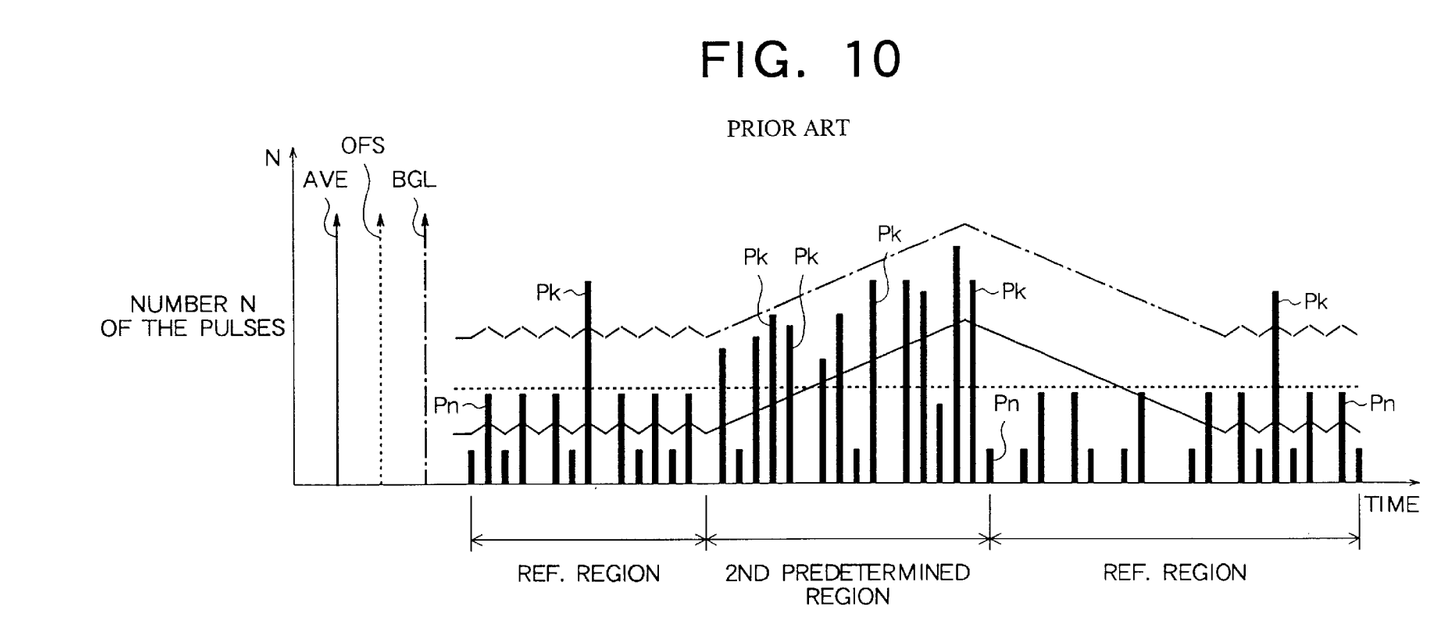
FIG. 10 is a diagram illustrating the operation for detecting the knocking in the second predetermined region using the conventional device for detecting the knocking of an internal combustion engine.

Next, described below with reference to FIGS. 9 and 10 is the operation for detecting the knocking of when the average knocking level AVE has shifted (increased or decreased).

In FIGS. 9 and 10, the abscissa represents the time and the ordinate (level in the form of a bar graph) represents the number N of the pulses, and there are shown the number Pn of the pulses corresponding to the noise level and the number Pk of the pulses corresponding to the knocking level.

In these drawings, further, the solid curves represent changes in the average knocking level AVE with the passage of time, dotted curves represent changes in the offset value OFS with the passage of time, and dot-dash chain curves represent changes in the background level BGL (=AVE+OFS) with the passage of time.

Here, the offset value OFS (dotted line) remains constant since there is no change in the operation conditions.

FIG. 9 illustrates changes with the passage of time of when the average knocking level is shifted from a reference region (steady state) into a first predetermined region on the decreasing side and is returned again to the reference state.

FIG. 10 illustrates changes with the passage of time of when the average knocking level is shifted from the reference region into a second predetermined region on the increasing side and is returned again to the reference state.

In FIG. 9, the background level BGL (level for judging the knocking) based on the number N of the pulses (signals of the knock level) in the reference region is changing relatively stably and properly.

When the pulses are detected in a number Pk corresponding to the knocking level, therefore, the knocking is properly judged relying on N>BGL. Further, when the pulses are detected in a number Pn corresponding to the noise level, the noise is properly judged relying on N≦BGL.

When the average knocking level AVE is shifted to the first predetermined region as shown in FIG. 9 due to a change in the ionic current detection system inclusive of the spark plug 2 with the passage of time, however, the steady noise level contained in the knock signals Ki decreases, whereby the average knocking level AVE decreases and the background level BGL decreases, too, following the average knocking level AVE.

In the first predetermined region, therefore, the background level BGL does not properly change, whereby the number Pn of the pulses of the noise level exceeds the background level BGL, and the judgement is incorrectly rendered to be that the knocking is occurring.

In FIG. 10, further, when the average knocking level AVE is shifted from the reference region to the second predetermined region due to a change in the ionic current detection system inclusive of the spark plug 2 with the passage of time, the steady noise level contained in the knock signals Ki increases, whereby the average knocking level AVE increases and the background level BGL increases, too, following the average knocking level AVE.

In the second predetermined region, therefore, the background level BGL does not properly change, whereby the number Pk of the pulses of the knocking level becomes smaller than the background level BGL, and the signals are incorrectly judged to be the noise signals.

According to the conventional device for detecting the knocking of an internal combustion engine as described above, the offset value OFS remains constant so far as there is no change in the operation conditions. Therefore, the background level BGL becomes improper in the first or second predetermined region, making it difficult to correctly judge the knocking.

That is, in the first predetermined region, the number Pn of the pulses of the noise signals of when no knocking is occurring is erroneously judged to be the number Pk of the pulses of when the knocking is occurring and in the second predetermined region, the number Pk of the pulses of when the knocking is frequently occurring is erroneously judged to be the number Pn of the pulses of the noise signals.

SUMMARY OF THE INVENTION

The present invention was accomplished in order to solve the above-mentioned problems, and its object is to provide a device for detecting the knocking of an internal combustion engine, which maintains the background level at an optimum value irrespective of a state into which the signals of the knocking level have shifted and, hence, prevents the erroneous detection of noise or the erroneous detection of knocking when the signals of the knocking level have shifted into the increasing side or the decreasing side, enhancing the reliability.

A device for detecting the knocking of an internal combustion engine according to the present invention comprises:
  various sensors for detecting the operation conditions of an internal combustion engine;
  an ionic current detecting means for detecting the ionic current that flows through a spark plug during the combustion in said internal combustion engine;
  a filter means for picking up knock signals from said ionic current;
  a knocking level operation means for operating signals of the knocking level corresponding to the knocking state of said internal combustion engine based on said knock signals;
  an averaging means for operating an average knocking level by averaging said signals of the knocking level;
  an offset operation means for operating an offset value of said average knocking level depending on the operation conditions of said internal combustion engine;
  a background level operation means for operating a background level by adding up said average knocking level and said offset value together; and
  a knock judging means for judging the knocking state of said internal combustion engine by comparing said signals of the knocking level with said background level;
  wherein provision is further made of:
    a predetermined region judging means for judging said average knocking level that lies in a predetermined region; and
    an offset correction means for correcting said offset value depending on the result of judgement by said predetermined region judging means; wherein
    said predetermined region judging means judges said predetermined region when said average knocking level is in an increasing state or in a decreasing state compared to a reference region; and
    said offset correction means corrects said offset value toward a direction to cancel the increment or the decrement of said average knocking level depending on the result of judgement by said predetermined region judging means, and corrects said background level to an optimum value.

In the device for detecting the knocking of an internal combustion engine according to the present invention, provision is made of an offset correction inhibition means for inhibiting the processing by said offset correction means when the rotational speed of said internal combustion engine is in a low rotational speed region lower than a predetermined rotational speed.

In the device for detecting the knocking of an internal combustion engine according to the present invention, said offset correction means selectively sets an offset correction coefficient depending upon the result of judgement by said predetermined region judging means, and said offset means corrects said offset value by using said offset correction coefficient.

In the device for detecting the knocking of an internal combustion engine according to the present invention, said offset correction means sets said offset correction coefficient to a value larger than 1 when said average knocking level lies in a first predetermined region which is smaller than a lower-limit value of said reference region, and sets said offset correction coefficient to a value smaller than 1 when said average knocking level is larger than an upper-limit value of said reference region.

In the device for detecting the knocking of an internal combustion engine according to the present invention, said averaging means includes a second averaging means that sets a reflection factor of said signals of the knocking level to a large value on a side where said average knocking level increases, and said predetermined region judging means judges said predetermined region based on a second average knocking level operated by said second averaging means.

DESCRIPTION OF THE PREFERRED EMBODIMENTS

Embodiment 1

An embodiment 1 of the present invention will now be described with reference to the drawings.

Figure 1:
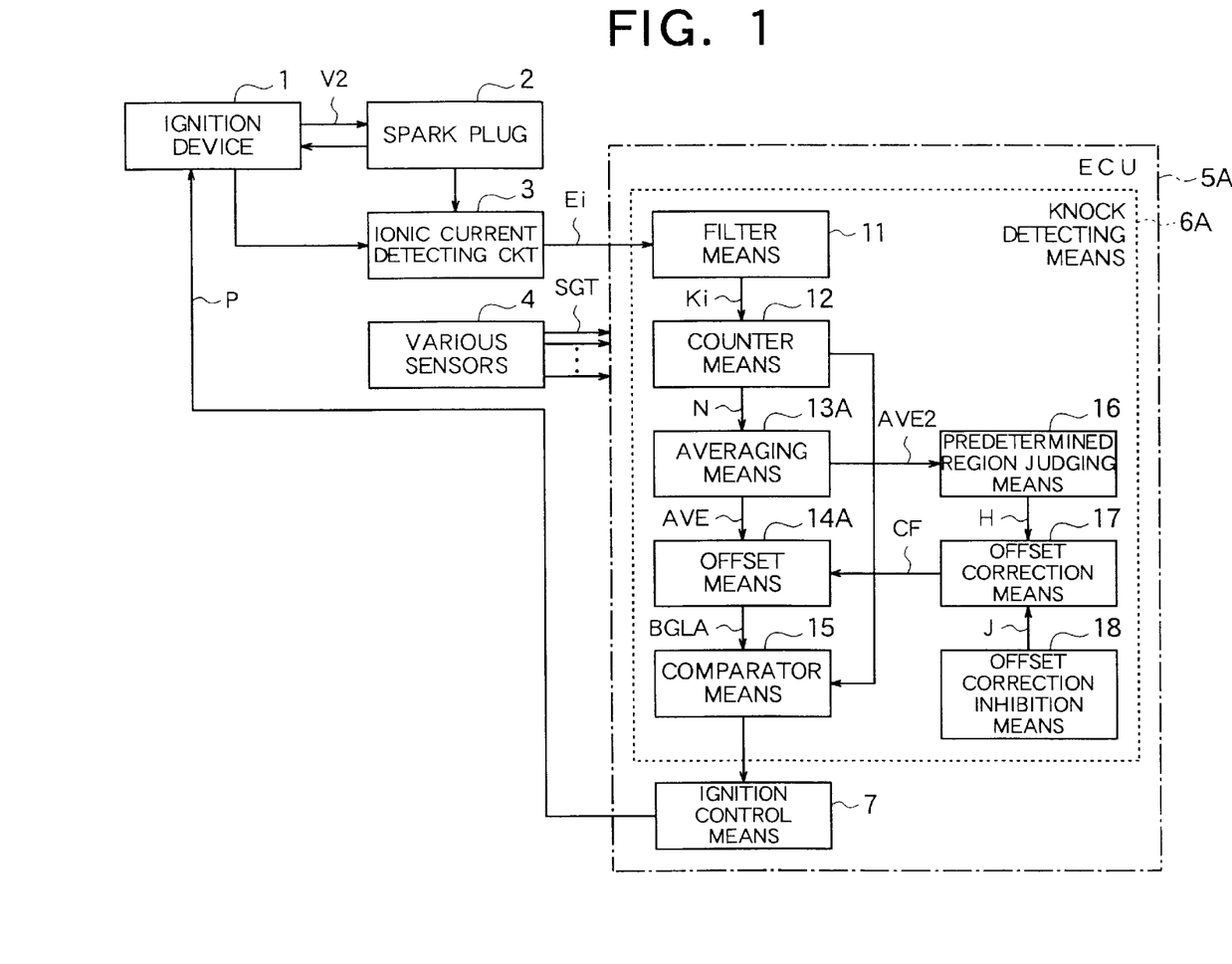
FIG. 1 is a block diagram illustrating an embodiment 1 of the present invention.

FIG. 1 is a block diagram schematically illustrating the embodiment 1 of the present invention, wherein the same portions as those described above (see FIG. 6) are denoted by the same reference numerals but are not described here again in detail.

In FIG. 1, the knock detecting means 6A in the ECU 5A further includes a predetermined region judging means 16, an offset correction means 17 and an offset correction inhibition means 18 in addition to the filter means 11 through up to the comparator means 15.

In this case, the averaging means 13A includes a second averaging means (not shown) that sets the reflection factor of the number N of the pulses (signals of the knocking level) to a large value on the side where the average knocking level AVE increases, and forms a second average knocking level AVE2 operated by the second averaging means.

The predetermined region judging means 16 judges the average knocking level AVE that lies in a predetermined region (increasing state or decreasing state compared to the reference region) based on the second average knocking level AVE2, and forms a predetermined region judgement signal H as a result of judgement.

The offset correction means 17 selectively sets an offset correction coefficient CF depending on the predetermined region judgement signal H. Therefore, the offset means 14A corrects the offset value OFS forward a direction to cancel the increment or the decrement of the average knocking level AVE, and the background level BGLA is corrected to an optimum value.

That is, the offset correction means 17 sets the offset correction coefficient CF to a value larger than "1" when the second average knocking level AVE2 lies in the first predetermined region which is smaller than a lower-limit value β of the reference region, and sets the offset correction coefficient CF to a value smaller than "1" when the second average knocking level AVE2 lies in the second predetermined region which is larger than an upper-limit value α of the reference region.

When the rotational speed of the engine is in a low rotational speed region lower than a predetermined rotational speed, the offset correction inhibition means 18 forms an offset correction inhibition signal J and inhibits the processing by the offset correction means 17.

The offset means 14A corrects the offset value OFS in a direction to cancel the increment or the decrement of the average knocking level AVE by using the offset correction coefficient CF, and sets the background level VGLA.

Next, the operation of the embodiment 1 of the invention shown in FIG. 1 will be described with reference to a diagram of FIG. 2 and a flow chart of FIG. 3.

Figure 2:
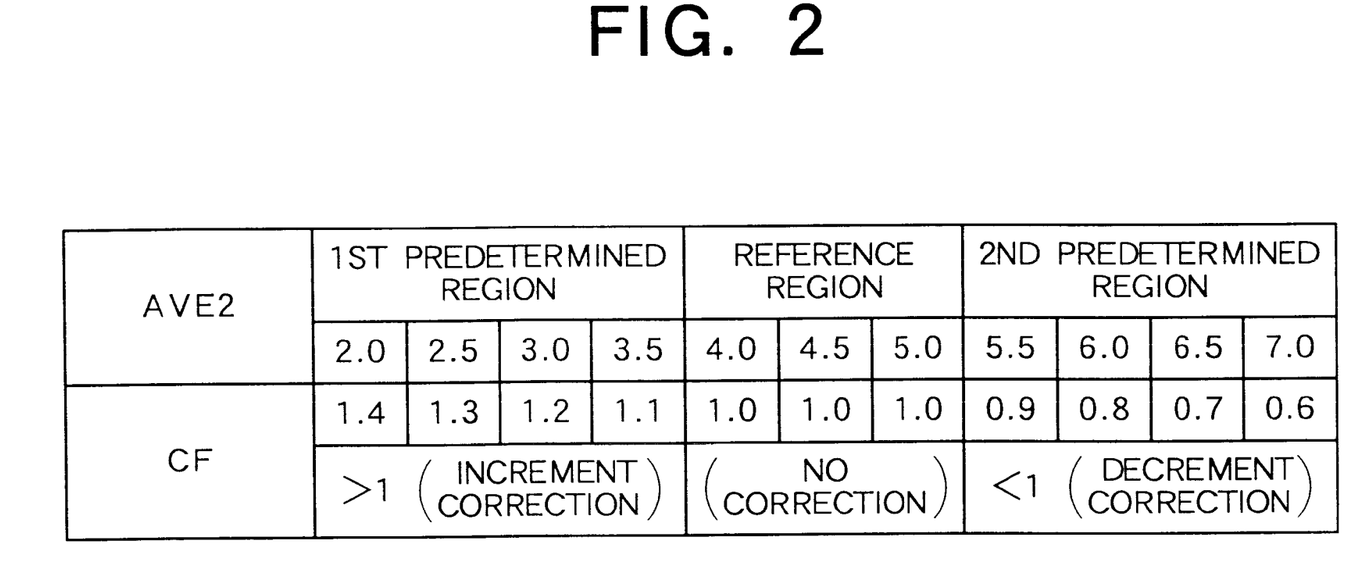
FIG. 2 is a diagram illustrating the offset correction operation according to the embodiment 1 of the present invention.

FIG. 2 illustrates a relationship between the second average knocking level AVE2 and the offset correction coefficient CF.

In FIG. 2, the offset correction coefficient CF is set to a value (increasing side) larger than "1" when the second average knocking level AVE2 lies in the first predetermined region (region where the noise level decreases), is set to a value (decreasing side) smaller than "1" when the second average knocking level AVE2 lies in the second predetermined region (region where the knocking frequently occurs), and is set to "1" (normal value with no correction) when the second average knocking value AVE2 lies in the reference region (steady region).

Figure 3:
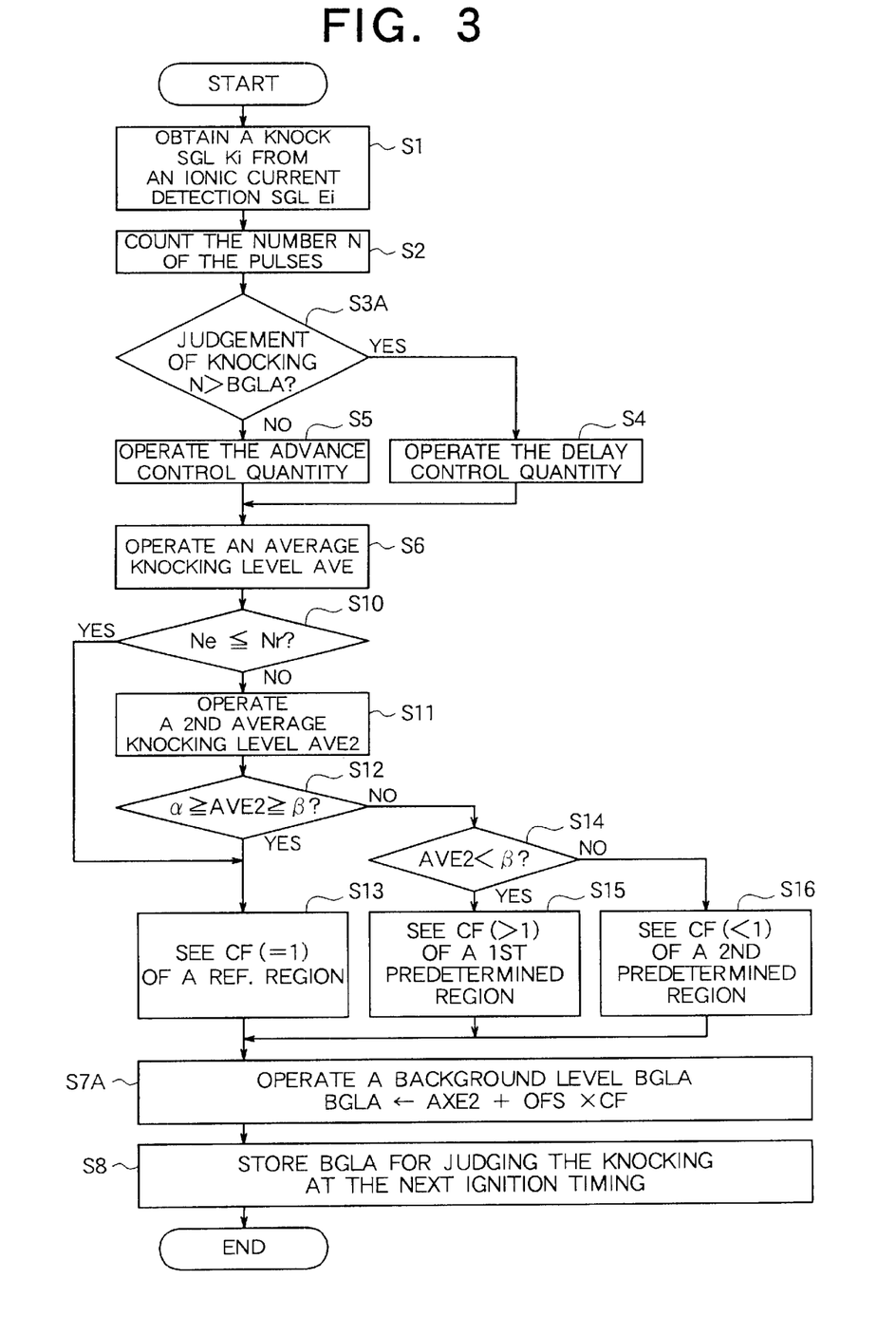
FIG. 3 is a flow chart illustrating the offset correction operation according to the embodiment 1 of the present invention.

In FIG. 3, the steps which are the same as those described above (see FIG. 8) are denoted by the same reference numerals S1 to S8, but are not described here again in detail. The steps S3A and S7A are corresponding to the above-mentioned steps S3 and S7, respectively.

First, the knock detecting means 6A in the ECU 5A obtains knock signals Ki from the ionic current detection signals Ei (step S1), counts the number N of the pulses of a knocking frequency (step S2), operates the ignition timing control quantity (step S4 or S5) based on the judgement of knocking (step S3A) and, then, the averaging means 13A operates an average knocking level AVE (step S6).

Then, the offset correction inhibition means 18 makes a reference to the engine rotational speed Ne among the operation data input from various sensors 4, and judges whether the engine rotational speed Ne is lower than a predetermined rotational speed Nr (e.g., 1500 rpm) which is on the low rotational speed side (step S10).

When it is judged that Ne≦Nr (i.e., YES), the offset correction inhibition means 18 forms an offset correction inhibition signal J, inhibits the processing by the offset correction means 17, and the routine proceeds to a no-correction processing (step S13) that will be described later.

In the low rotational speed operation region, therefore, the offset value OFS is not corrected and the background level BGLA does not increase undesirably.

This is because, on the low rotational speed side, the second average knocking level AVE2 becomes very small making it easy to judge the knocking level over the noise level irrespective of the result of judgement in a predetermined region.

On the other hand, when it is judged at step S10 that Ne>Nr (i.e., NO), the averaging means 13A operates the second average knocking level AVE2 according to the following formula (4)(step S11), $$AVE2=AVE2(n-1)+\{NP-AVE2(n-1)\} \times KF2 \quad (4)$$

where AVE2(n−1) is the second average knocking level AVE2 of the previous time, and KF2 is the second averaging coefficient (KF2>1).

The second averaging coefficient KF2 is variably set depending on the number N of the pulses, and is set to a large value as the number N of the pulses becomes larger than the second average knocking level AVE2(n−1) of the previous time.

According to the averaging processing of the formula (4), therefore, the second average knocking level AVE2 changes more quickly toward the side where the noise level increases and is, hence, set to a value close to a peak noise.

Next, the predetermined region judging means 16 compares the second average knocking level AVE2 with the upper-limit value α and the lower-limit value β corresponding to the reference region, and judges in which region the number N of the pulses now detected lies.

First, it is judged whether the second average knocking level lies within the reference region (step S12). When it is judged that α≧AVE2≧β (i.e., YES), a predetermined region judgement signal H is output indicating that the second average knocking level AVE2 lies in the reference region.

Then, the offset correction means 17 makes a reference to the offset correction coefficient CF (=1) in the reference region based on the data map (step S13), and inputs it to the offset means 14A. In the offset means 14A, in this case, the offset value OFS is maintained at a normal value without being corrected.

When it is judged at step S12 that the second average knocking level AVE2 is outside the reference region (i.e., NO), then, it is judged whether the second average knocking level AVE2 is in the first predetermined region which-is smaller than the lower-limit value β (step S14).

When it is judged that AVE2<β (i.e., YES), the predetermined region judging means 16 produces a predetermined region judgement signal H representing the existence in the first predetermined region.

Then, the offset correction means 17 makes a reference to the offset correction coefficient CF (>1) in the first predetermined region (step S15), and inputs it to the offset means 14A to correct the offset value OFS toward the increasing side.

When it is judged at step S14 that AVE2>α (i.e., NO), the predetermined region judging means 16 produces a predetermined region judgement signal H representing the existence in the second predetermined region.

Then, the offset correction means 17 makes a reference to the offset correction coefficient CF (<1) in the second predetermined region (step S16), and inputs it to the offset means 14A to correct the offset value OFS toward the decreasing side.

Hereinafter, the offset means 14A operates the background level BGLA after correction in compliance with the following formula (5) by using the offset correction coefficient CF set at step S13, S15 or S16 (step S7A), $$BGLA=AVE2+OFS \times CF \quad (5)$$

Finally, the background level BGLA operated according to the equation (5) is stored as a value for judging the knocking next time at step S3A (step S8), and the processing routine of FIG. 3 ends.

Figure 4:
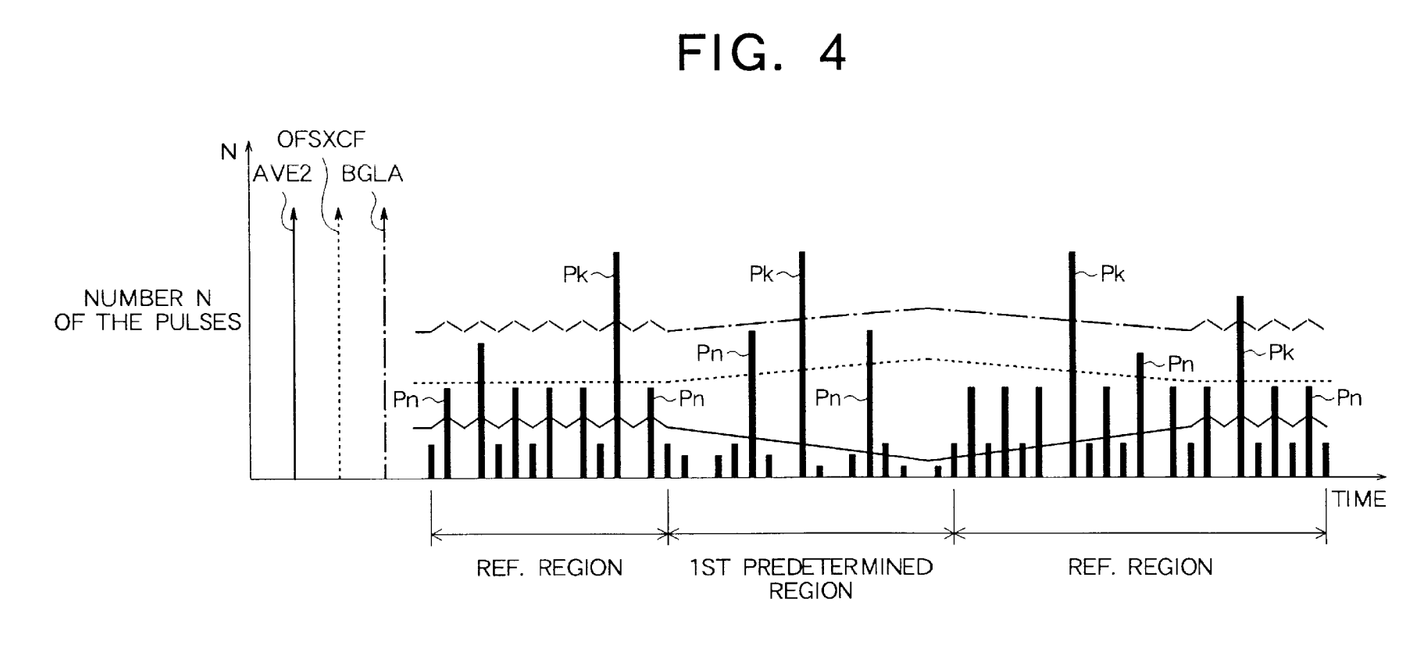
FIG. 4 is a diagram illustrating the operation for detecting the knocking in a first predetermined region according to the embodiment 1 of the present invention.
Figure 5:
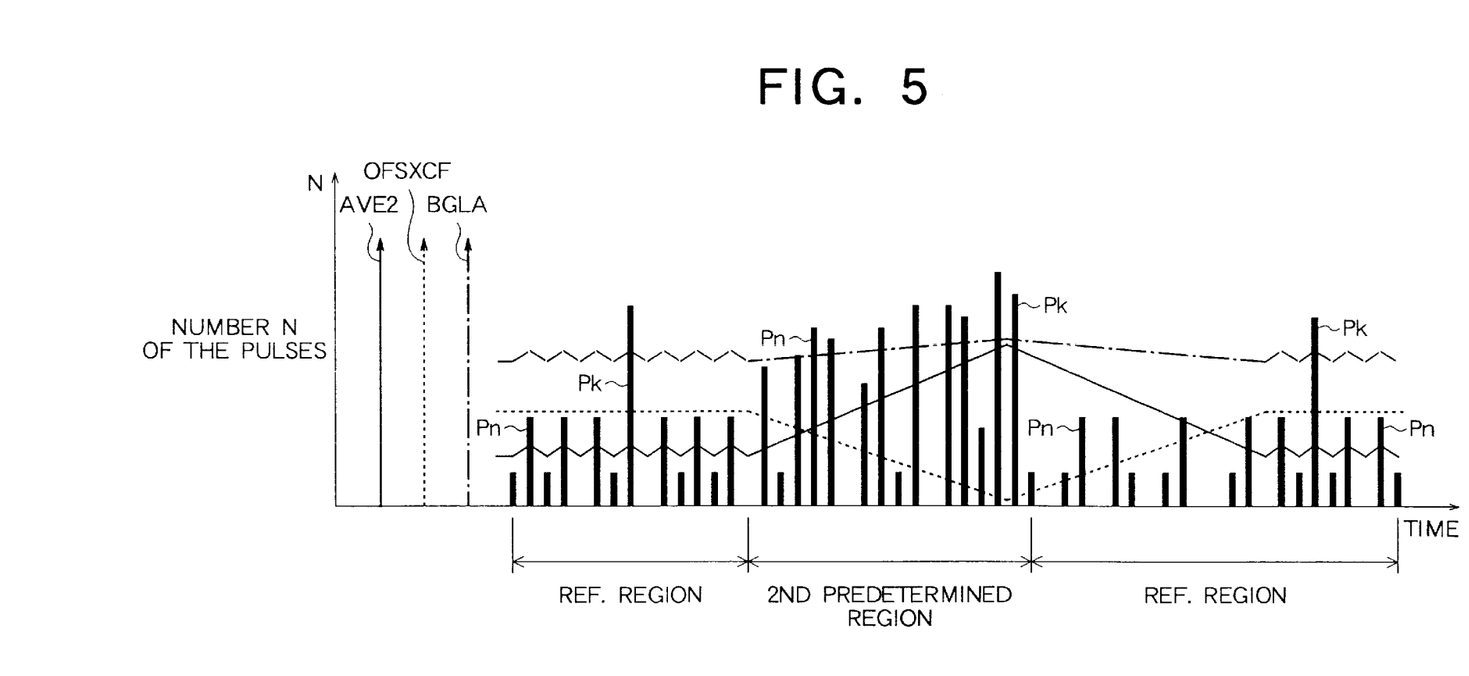
FIG. 5 is a diagram illustrating the operation for detecting the knocking in a second predetermined region according to the embodiment 1 of the present invention.

Next, described below with reference to FIGS. 4 and 5 is the operation for detecting the knocking of when the average knocking level AVE has shifted (increased or decreased).

FIGS. 4 and 5 correspond to FIGS. 9 and 10, and the portions same as those described above are denoted by the same reference numerals but their description is not repeated in detail.

Here, the solid curves represent changes in the second average knocking level AVE2 with the passage of time, dotted curves represent changes in the offset value OFS+CF after correction with the passage of time, and dot-dash chain curves represent changes in the background level BGLA (=AVE2+OFS×CF) after correction with the passage of time.

FIG. 4 illustrates the case where the average knocking level has shifted to the first predetermined region, and FIG. 5 illustrates the case where the average knocking level has shifted to the second predetermined region.

In FIGS. 4 and 5, the offset values OFS×CF (dotted lines) after correction are increased or decreased depending on the result of judgement in the predetermined region, and the background level BGLA increases or decreases correspondingly.

Referring to FIG. 4, when the number N of the pulses (signals of the knocking level) is shifted to the first predetermined region (region where the noise level decreases) due to a change in the ionic current detection system with the passage of time, reference is made to an offset correction coefficient CF (>1) for canceling a drop in the second average knocking level AVE2. Due to the addition of the offset value OFS×CF after the increment correction, therefore, a drop in the level BGLA for judging the knocking (dot-dash chain line) is suppressed.

When the number Pk of the pulses corresponding to the knocking level is detected, therefore, the knocking is normally judged relying on N>BGLA. When the number Pn of the pulses corresponding to the noise level is detected, on the other hand, the noise is normally judged relying on N≦BGLA. This makes it possible to prevent erroneous judgement of the knocking.

Referring to FIG. 5, further, when the number N of the pulses is shifted to the second predetermined region (where the knocking frequently occurs), reference is made to the offset correction coefficient CF (<1) for canceling an increase in the second average knocking level AVE2. Due to the addition of the offset value OFS×CF after the increment correction, therefore, an increase in the level BGLA for judging the knocking (dot-dash chain line) is suppressed.

Therefore, the knocking and the noise are normally judged, preventing erroneous judgement of the noise.

Thus, upon correcting the offset value OFS depending upon the result of judgement in a predetermined region, it is allowed to change the background level BGLA that serves as a reference for judging the noise level into an optimum value.

Even when the number N of the pulses is shifted to the first predetermined region or to the second predetermined region due to a change in the knocking level caused by a change with the passage of time, it is allowed to reliably detect the knocking based on the proper judgement of knocking, and the delay control state at the ignition timing can be improved when the knocking has occurred.

Further, the offset correction inhibition means 18 inhibits the offset correction on the low rotational speed side of the engine rotational speed Ne, making it possible to prevent unnecessary increment correction for the background level BGLA.

In the above-mentioned embodiment 1, the number N of the pulses of the knock signals Ki was used as the signal of the knocking level. As is well known, however, there can be used any parameter such as a peak value or an integrated value of the knock signals Ki as a matter of course.

Further, the predetermined region was judged from the second average knocking level AVE2. However, the predetermined region may be judged based on a normal average knocking level AVE.

Moreover, the offset correction inhibition means 18 was provided to inhibit the offset correction on the low rotational speed side. If there occurs no hindrance, however, the offset correction inhibition means 18 may be omitted, and offset correction processing may be executed even on the low rotational speed side.

What is claimed is:

1. A device for detecting the knocking of an internal combustion engine comprising:

various sensors for detecting operation conditions of an internal combustion engine;

an ionic current detecting means for detecting ionic current that flows through a spark plug during a combustion in said internal combustion engine;

a filter means for picking up knock signals from said ionic current;

a knocking level operation means for operating signals of a knocking level corresponding to a knocking state of said internal combustion engine based on said knock signals;

an averaging means for operating an average knocking level by averaging said signals of the knocking level;

an offset operation means for operating an offset value of said average knocking level depending on the operation conditions of said internal combustion engine;

a background level operation means for operating a background level by adding up said average knocking level and said offset value together; and a knock judging means for judging the knocking state of said internal combustion engine by comparing said signals of the knocking level with said background level;

wherein provision is further made of:

a predetermined region judging means for judging said average knocking level that lies in a predetermined region; and an offset correction means for correcting said offset value depending on a result of judgement by said predetermined region judging means; wherein said predetermined region judging means judges said predetermined region when said average knocking level is in an increasing state or in a decreasing state compared to a reference region; and said offset correction means corrects said offset value toward a direction to cancel the increment or the decrement of said average knocking level depending on the result of judgement by said predetermined region judging means, and corrects said background level to an optimum value.

2. A device for detecting the knocking of an internal combustion engine according to claim 1, wherein provision is made of an offset correction inhibition means for inhibiting the processing by said offset correction means when a rotational speed of said internal combustion engine is in a low rotational speed region lower than a predetermined rotational speed.

3. A device for detecting the knocking of an internal combustion engine according to claim 1, wherein said offset correction means selectively sets an offset correction coefficient depending upon the result of judgement by said predetermined region judging means, and said offset means corrects said offset value by using said offset correction coefficient.

4. A device for detecting the knocking of an internal combustion engine according to claim 3, wherein said offset correction means sets said offset correction coefficient to a value larger than 1 when said average knocking level lies in a first predetermined region which is smaller than a lower-limit value of said reference region, and sets said offset correction coefficient to a value smaller than 1 when said average knocking level lies in a second predetermined region which is larger than an upper-limit value of said reference region.

5. A device for detecting the knocking of an internal combustion engine according to claim 1, wherein said averaging means includes a second averaging means that sets a reflection factor of said signals of the knocking level to a large value on a side where said average knocking level increases, and said predetermined region judging means judges said predetermined region based on a second average knocking level operated by said second averaging means.

* * * * *